(12) United States Patent
Dumas et al.

(10) Patent No.: US 11,993,408 B2
(45) Date of Patent: May 28, 2024

(54) MASKING BLADED DISC FOR REDUCING THE RADAR SIGNATURE OF A MOVING COMPRESSOR MOVING DISC OF A JET ENGINE

(71) Applicant: SAFRAN AIRCRAFT ENGINES, Paris (FR)

(72) Inventors: Michel Dumas, Moissy-Cramayel (FR); Laurent Christophe Francis Villaines, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/415,395

(22) PCT Filed: Dec. 4, 2019

(86) PCT No.: PCT/FR2019/052918
§ 371 (c)(1),
(2) Date: Jun. 17, 2021

(87) PCT Pub. No.: WO2020/128201
PCT Pub. Date: Jun. 25, 2020

(65) Prior Publication Data
US 2022/0042518 A1    Feb. 10, 2022

(30) Foreign Application Priority Data

Dec. 20, 2018    (FR) ........................................ 1873465

(51) Int. Cl.
*B64U 20/10*    (2023.01)
*B64D 7/00*    (2006.01)
(Continued)

(52) U.S. Cl.
CPC ............... *B64U 20/10* (2023.01); *B64D 7/00* (2013.01); *F01D 5/141* (2013.01); *F01D 9/02* (2013.01);
(Continued)

(58) Field of Classification Search
CPC .......... F01D 17/162; F01D 5/141; F01D 9/02; B64D 7/00; F02C 3/04; F02C 7/042;
(Continued)

(56) References Cited

U.S. PATENT DOCUMENTS 3,829,237 A * 8/1974 Chestnutt ................ F02C 7/045
415/181
3,908,683 A * 9/1975 Demetrick .............. F02C 7/045
137/15.1
(Continued)

FOREIGN PATENT DOCUMENTS

RU    2 623 031 C1    6/2017

OTHER PUBLICATIONS

International Search Report dated Mar. 31, 2020 in PCT/FR2019/052918 filed on Dec. 4, 2019, 3 pages.
(Continued)

*Primary Examiner* — Brian Christopher Delrue
(74) *Attorney, Agent, or Firm* — Oblon, McClelland, Maier & Neustadt, L.L.P.

(57) ABSTRACT

A bladed disc for masking a moving disc of a jet engine, including blades, each blade including a pressure-side wall and a suction-side wall that meet at a leading-edge and at a trailing edge, and wherein each blade has a pressure-side wall and a suction-side wall each including a concave zone and a convex zone that are at a distance from the leading-edge and from the trailing edge and are spaced apart from one another, these concave zones and these convex zones each extending over the majority of the height of the blade,
(Continued)

the concave zone of the pressure-side wall is opposite the convex zone of the suction-side wall, the concave zone of the suction-side wall is opposite the convex zone of the pressure-side wall.

8 Claims, 3 Drawing Sheets

(51) Int. Cl.
| | |
|---|---|
| *F01D 5/14* | (2006.01) |
| *F01D 9/02* | (2006.01) |
| *F01D 17/16* | (2006.01) |
| *F02C 3/04* | (2006.01) |
| *F02C 7/042* | (2006.01) |
| *F02K 3/06* | (2006.01) |
| *F04D 19/00* | (2006.01) |
| *F04D 29/18* | (2006.01) |
| *F04D 29/54* | (2006.01) |

(52) U.S. Cl.
CPC ............. *F01D 17/162* (2013.01); *F02C 3/04* (2013.01); *F02C 7/042* (2013.01); *F02K 3/06* (2013.01); *F04D 19/002* (2013.01); *F04D 29/181* (2013.01); *F04D 29/544* (2013.01); *F05D 2220/3217* (2013.01); *F05D 2220/323* (2013.01); *F05D 2240/12* (2013.01); *F05D 2250/711* (2013.01); *F05D 2250/712* (2013.01); *F05D 2260/96* (2013.01)

(58) Field of Classification Search
CPC ........ F02K 3/06; F04D 19/002; F04D 29/181; F04D 29/544; B64C 2201/22; F05D 2220/3217; F05D 2220/323; F05D 2240/12; F05D 2250/711; F05D 2250/712
See application file for complete search history.

(56) References Cited

U.S. PATENT DOCUMENTS

| | | | | |
|---|---|---|---|---|
| 5,794,432 | A * | 8/1998 | Dunbar | F02K 1/16 |
| | | | | 60/226.1 |
| 6,619,916 | B1 * | 9/2003 | Capozzi | F02C 7/042 |
| | | | | 415/161 |
| 7,195,456 | B2 * | 3/2007 | Aggarwala | F01D 9/041 |
| | | | | 416/233 |
| 7,922,445 | B1 * | 4/2011 | Pankey | F01D 17/20 |
| | | | | 415/160 |
| 2006/0254271 | A1 * | 11/2006 | Imanari | F02K 3/06 |
| | | | | 60/598 |
| 2015/0361819 | A1 * | 12/2015 | Epstein | F01D 1/023 |
| | | | | 415/208.1 |
| 2016/0369651 | A1 * | 12/2016 | Sobanski | F02K 3/04 |
| 2017/0058691 | A1 * | 3/2017 | Rice | F01D 5/146 |
| 2018/0291753 | A1 * | 10/2018 | Filipenco | F01D 9/065 |
| 2019/0128189 | A1 * | 5/2019 | Rambo | F02K 3/115 |

OTHER PUBLICATIONS

French Preliminary Search Report (with English translation of Categories of Cited Documents) dated Oct. 11, 2019 in French Application 1873465 filed on Dec. 20, 2018, 2 pages.

* cited by examiner

MASKING BLADED DISC FOR REDUCING THE RADAR SIGNATURE OF A MOVING COMPRESSOR MOVING DISC OF A JET ENGINE

TECHNICAL FIELD

The invention relates to a turbojet type engine equipped with means for reducing its radar and/or sound signature.

STATE OF PRIOR ART

A radar is an electromagnetic wave emitter comprising a receiver to detect whether or not part of the waves it emits are reflected by an object or obstacle present in the emission region of these waves.

In the case of a so-called stealth aircraft, the outer elements of this aircraft are treated to limit reflection of electromagnetic waves, so as to make it as faintly detectable by radar as possible.

When this aircraft is equipped with a turbojet engine type propulsion system, air is taken into an inlet duct to first pass through a low pressure compressor comprising a series of rotating vanes before splitting into a central primary flow and a secondary flow surrounding the primary flow.

The rotating elements of this turbojet engine are per se a source of detection, as they reflect radar waves, and thereby contribute to making the aircraft detectable.

One possibility for limiting radar detection of the low pressure compressor is to bend the inlet duct so that the incident radar waves are deflected by reflection on the tilted walls of the duct as they travel through it. These waves are thus obliquely incident on the rotor elements of the engine, so that they are scattered by them to be faintly reflected towards the inlet of the duct.

In practice, this solution is still insufficient, and the radar detection level of the low pressure compressor of a turbojet engine is still too high.

In this context, the object of the invention is to provide a solution for reducing the radar detection level of the rotor elements of a low pressure compressor for a turbojet engine.

DISCLOSURE OF THE INVENTION

To this end, one object of the invention is a masking bladed wheel of a turbojet engine moving wheel, including vanes, each vane comprising a lower surface wall and an upper surface wall joined at a leading edge and at a trailing edge and extending along a span axis from a root up to a tip, and wherein:
- the lower surface wall includes an upstream portion extending from the leading edge to a convex zone of this lower surface wall, a central portion extending from the convex zone to a concave zone of this lower surface wall, and a downstream portion extending from the concave zone to the trailing edge;
- the upper surface wall includes an upstream portion extending from the leading edge to a concave zone of said upper surface wall, a central portion extending from the concave zone to a convex zone of this upper surface wall, and a downstream portion extending from the convex zone to the trailing edge;
- these concave zones and convex zones each extend over most of the height of the vane along its span axis;
- the concave zone of the lower surface wall faces the convex zone of the upper surface wall, and the concave zone of the upper surface wall faces the convex zone of the lower surface wall.

With this arrangement, incoming magnetic waves passing through the wheel are deflected to be obliquely incident on the wheel of the low pressure compressor so as to be faintly reflected by it.

The invention also relates to a bladed wheel thus defined, wherein each vane is a variable setting vane.

The invention also relates to a bladed wheel thus defined, wherein each vane includes a downstream portion extending from the trailing edge to the convex and concave zones of its upper and lower surface walls respectively, and wherein each downstream portion is a variable setting flap pivotably mounted between the convex and concave zones of its upper and lower surface walls respectively.

The invention also relates to a bladed wheel thus defined, wherein the vanes are covered with a coating absorbing electromagnetic radiations.

The invention also relates to a turbocharger comprising a low pressure compressor including a moving wheel upstream of which an inlet steering wheel is arranged, upstream of which a bladed wheel thus defined is mounted.

The invention also relates to a turbocharger comprising a low pressure compressor including a moving wheel upstream of which a bladed wheel thus defined is arranged.

DETAILED DISCLOSURE OF PARTICULAR EMBODIMENTS

The idea underlying the invention is to provide between the air inlet and the low pressure compressor, a wheel carrying fixed vanes arranged to geometrically mask the compressor rotor located downstream thereof.

Figure 1:
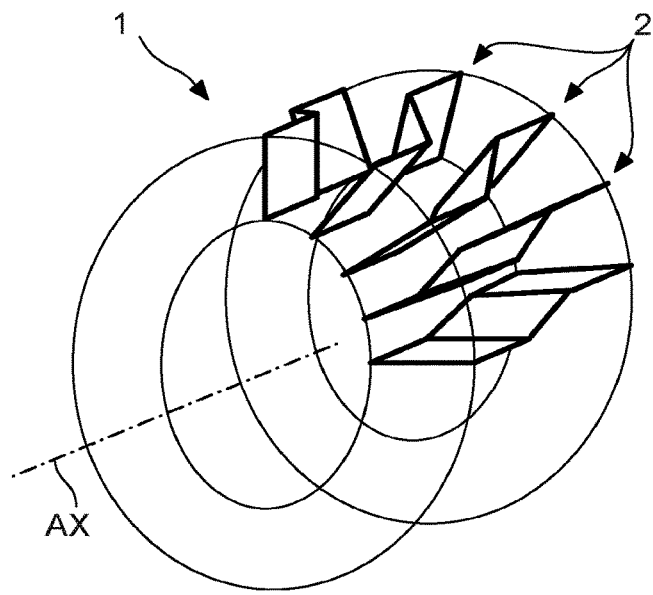
FIG. 1 is a schematic perspective view of a portion of the masking wheel according to the invention.

As schematically represented in FIG. 1, this masking wheel 1 carries fixed masking vanes 2 regularly distributed along its circumference, the shapes of which are arranged to delimit between them inter-vane channels in the form of baffles to offer reflection angles to the electromagnetic radiations which pass therethrough in order to deflect the same.

Figure 2:
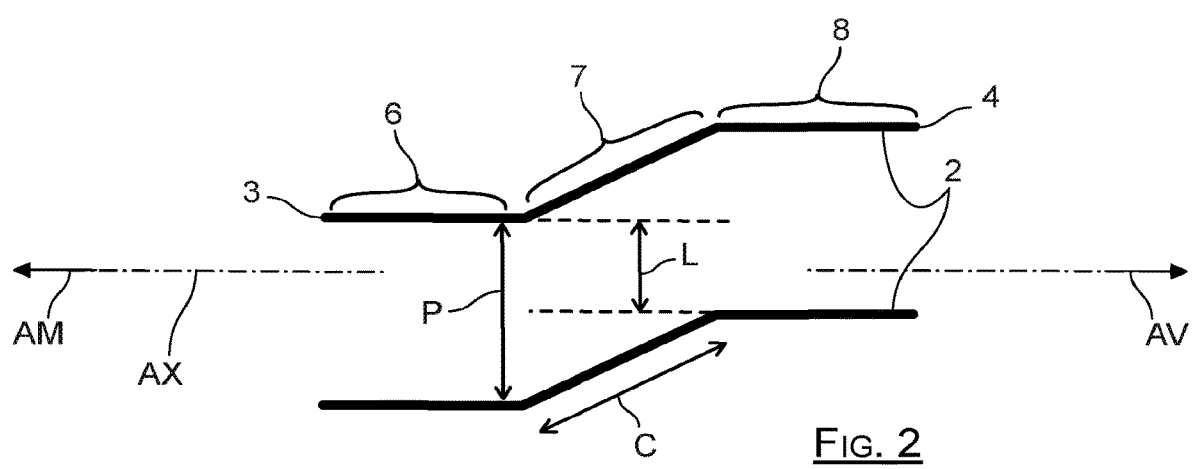
FIG. 2 is a schematic representation showing two consecutive vanes according to the invention in a top view.

As visible in FIG. 2, each vane 2 extends between a leading edge 3 and a trailing edge 4 both oriented in parallel to a span axis of the vane which is an axis radially extending with respect to a longitudinal axis AX of the engine when the vane is mounted. This vane 2 comprises an upstream axial portion 6 extending to a central oblique portion 7 itself extending to a downstream axial portion 8. The upstream portion, marked AM, and the downstream portion, marked AV, in the figures are defined in relation to the travel direction of airflow in the engine, that is along the longitudinal direction AX of the turbojet engine, in accordance with the usual conventions.

The upstream axial portion 6 extends in the longitudinal direction, that is approximately in a plane containing the longitudinal axis AX of the engine, to within about 10° tilt. The central portion in turn has an oblique orientation, which means that it is tilted with respect to axis AX. The downstream portion 8 is offset from the upstream portion about axis AX, while extending approximately longitudinally, that is this downstream portion extends in another plane passing through longitudinal axis AX, to within about 10° tilt.

The upstream, central, and downstream portions are symbolically represented by flat walls in FIGS. 1, 2, 5 and 9, for simplicity of understanding. In practice, each vane 2 has a curved shape that can be divided into upstream, central and downstream portions due to their functionality with respect to fluid flow and electromagnetic deflection.

Figure 3:
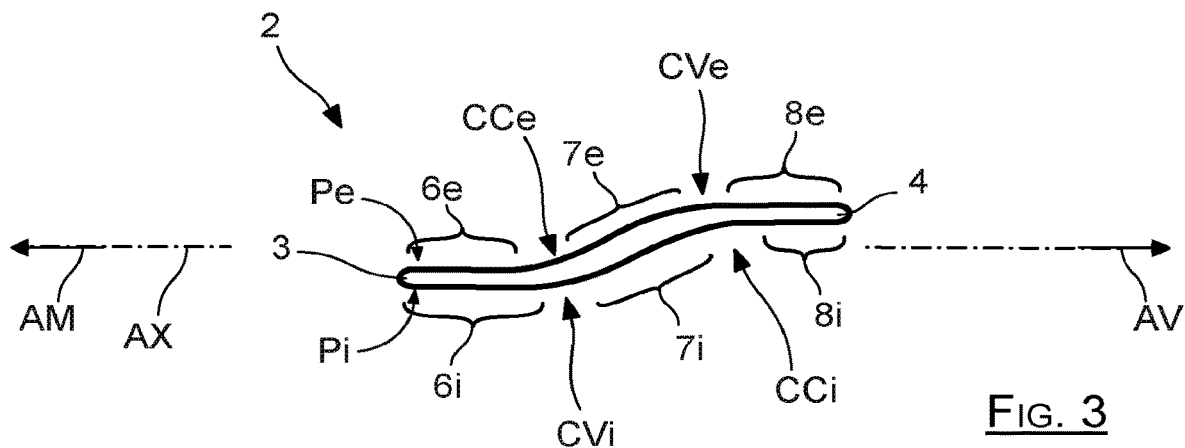
FIG. 3 is a cross-section view in an orthoradial plane of a vane according to the invention.
Figure 4:
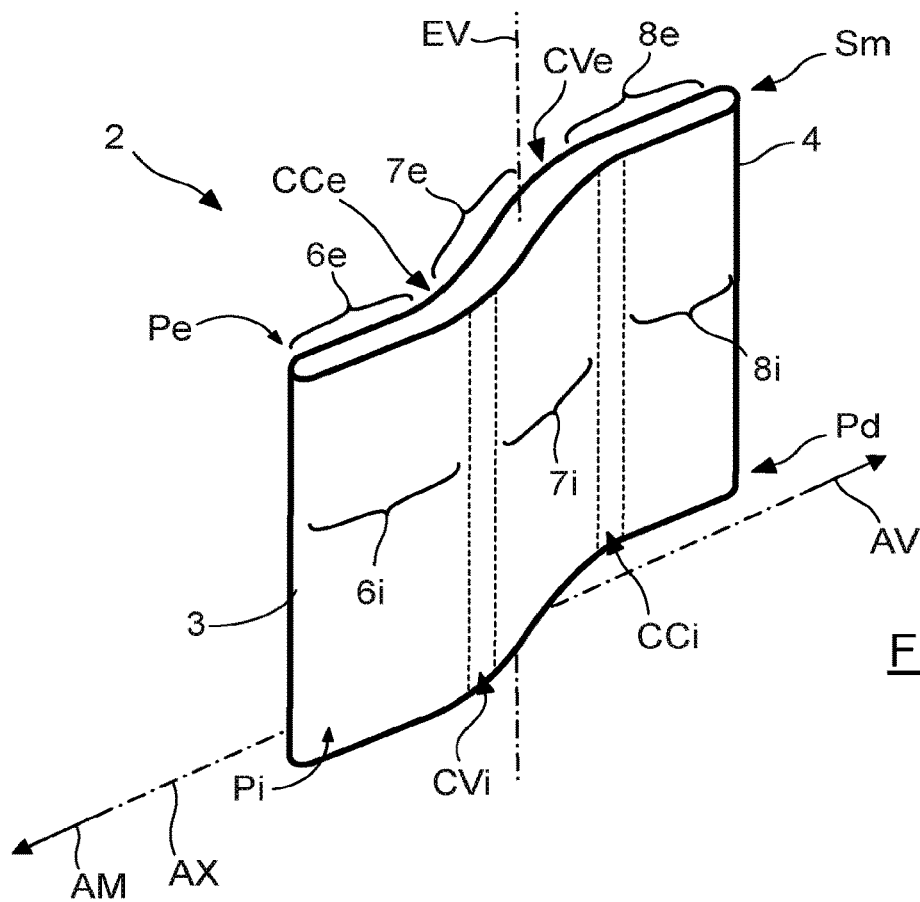
FIG. 4 is a perspective representation of a vane according to the invention.

An example of a vane 2 according to the invention having a curved shape is represented in FIGS. 3 and 4. This vane 2 comprises a curved upper surface wall Pe and a curved lower surface wall Pi, each connecting its leading edge 3 to its trailing edge 4, being laterally spaced from each other, and each extending from a root Pd to a tip Sm. The root Pd corresponds to the part by which this vane is connected or attached to an inner shell of the wheel 1, and its tip Sm corresponds to the part by which it is attached to an outer casing of this wheel 1.

The upper surface wall Pe includes, from the leading edge 3 to the trailing edge 4, an axial upstream portion 6e followed by a concave zone CCe followed by a central tilted portion 7e followed by a convex zone CVe followed by an axial downstream portion 8e terminating at the trailing edge. These zones and portions extend over most of the height of the blade, that is its length from its root Pd to its tip Sm measured along the span axis EV of this vane.

The lower surface wall Pi includes, from the leading edge 3 to the trailing edge 4, an axial upstream portion 6i followed by a convex zone CVi followed by a central tilted portion 7i followed by a concave zone CCi followed by an axial downstream portion 8i terminating by the trailing edge 4. These zones and portions extend over most of the height of the vane measured along its span axis EV.

Each central portion 7e and 7i extends between a convex zone and a concave zone, so that both central portions 7e and 7i each have an inversion of curvature.

As illustrated in FIG. 2, two consecutive masking vanes 2 delimit between them an inter-vane fluid passage channel which is a baffle between both oblique central portions 7 tilted with respect to axis AX.

Generally speaking, this channel can be characterised by its masking coefficient and by its relative pitch, which are representative of its geometry.

This channel thus has a pitch noted P, which is the distance separating two consecutive vanes 2 in a top view, that is along the circumference of the wheel 1, and which corresponds approximately to the ratio of the perimeter of the wheel to its number of vanes. This channel also has an apparent width L, corresponding to the smallest apparent distance between two consecutive vanes when the wheel is seen from the front, that is along axis AX.

The masking coefficient of the channel or of the wheel 1, that is the L/P ratio, thus corresponds to the proportion of the blades of the compressor wheel located downstream of the masking wheel 1, which is visible through the vanes of this wheel 1. In other words, for a radar located in axis AX, facing the wheel 1, the proportion of waves emitted that can be reflected by the blades of the compressor is at most L/P. The lower the effective masking coefficient, the more the radar is tilted with respect to axis AX.

The relative pitch of the inter-vane channel corresponds to the ratio of the pitch P to the chord length denoted as C of the oblique portion 7, that is P/C, and it mainly conditions aerodynamics of the channel.

The central oblique portion 7 of the vane 2 is the one that ensures masking: it is its tilt and its length that condition the L/P coefficient, that is the proportion of incident electromagnetic waves that are deflected by being reflected by this central oblique portion 7 when they pass through the wheel 1.

The upstream axial portion 6 is dedicated to straightening the incoming flow which can be disturbed especially by its path through the bent inlet duct. Guiding this flow in the upstream axial portion of the channel allows it to be straightened and a flow that limits the increase in entropy (limitation of losses by friction and shearing) to be obtained, in order to avoid a drop in the flow rate of air passing through the engine. These upstream axial portions thus provide the system with robustness against flow distortions of the incoming airflow.

The longer the upstream axial portion 6, the more likely the incident flow will be disturbed: in the case of an undisturbed flow, this upstream axial portion 6 could have a very low or even zero length to be non-existent.

The downstream axial portion 8 is dedicated to straightening the flow at the outlet of the central oblique portion: passage of the flow through the central oblique portion generates a gyration of this flow. The reduction of this gyration (flow straightening or untwisting) by the downstream axial portion 8 ensures optimal supply of the compression stages through which to pass. In practice, the flow gyration corresponds to a flow the streamlines of which have helical shapes about axis AX, as opposed to rectilinear streamlines parallel to axis AX in the case of a straightened flow.

Thus the longer the downstream axial portion 8, the more the flow has to be straightened to feed the compressor, so that this length can be very small or even zero in the case where the compressor has a high robustness against flow twisting.

Figure 5:
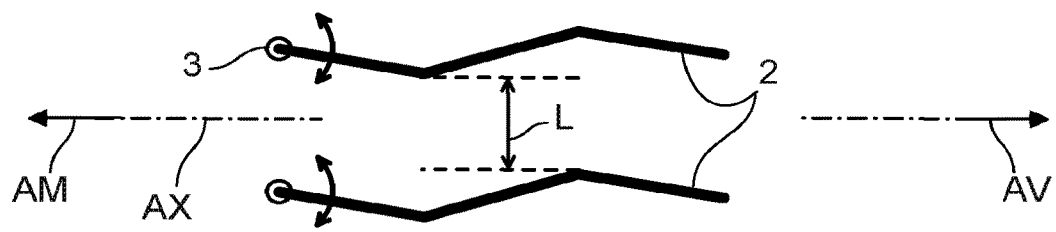
FIG. 5 is a schematic representation showing two consecutive masking vanes with variable setting in accordance with an alternative of the invention.

Furthermore, the masking vanes according to the invention can be provided with variable setting, to adjust the masking degree to the flight conditions. In this case, as represented in FIG. 5, each vane 2 is mounted to the wheel 1 so as to be able to pivot about a radial axis coinciding with its leading edge 3, in order to change its setting angle. Complementarily, the wheel 1 is thereby equipped with control means not represented which control setting of the vanes 2.

Thus, and as illustrated schematically in FIG. 5, a modification in the setting angle of the vanes 2 makes it possible, for example, to temporarily increase the apparent width L of the inter-vane channels, in order to favour efficiency of the engine at the expense of stealth.

Figure 6:
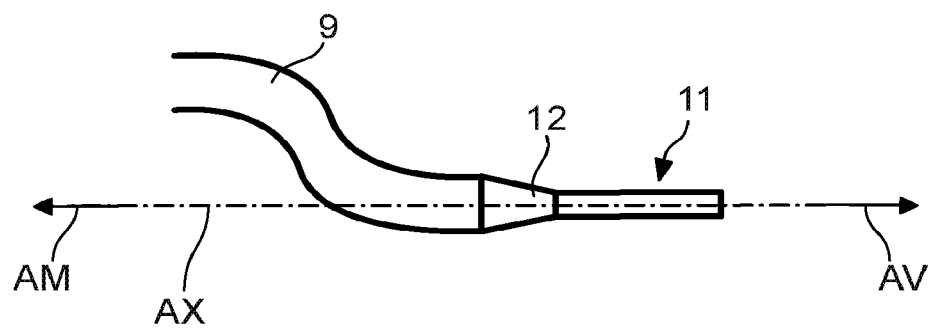
FIG. 6 is a longitudinal cross-section schematic representation of a propulsion system architecture comprising a bent inlet duct opening into a turbojet engine.

The masking wheel 1 is advantageously arranged upstream of a first moving wheel of the compressor in a propulsion system architecture as represented in FIG. 6, that is comprising a bent inlet duct 9 connected to a turbojet engine 11 comprising a compressor 12, to supply this turbojet engine 11 with air.

Figure 7:
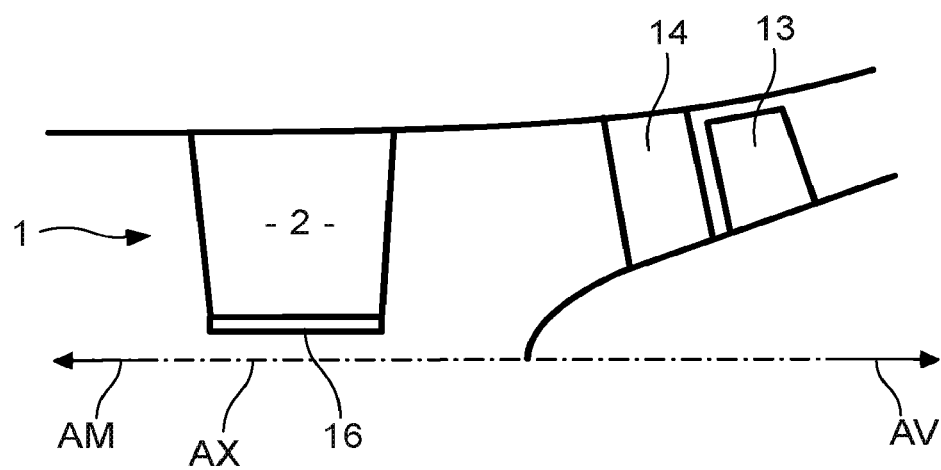
FIG. 7 is a schematic longitudinal cross-sectional view of a turbojet engine inlet portion equipped with a masking wheel according to the invention arranged upstream of an inlet steering wheel itself upstream of the low pressure compressor.

As visible in more detail in FIG. 7, the low pressure compressor 12 has a first bladed moving wheel 13 upstream of which a known inlet steering wheel 14 is arranged. This inlet steering wheel includes axially fixed vanes to stabilise the fluid flow that has passed through the inlet duct 9 before it passes through the first moving wheel 13.

The masking wheel 1 according to the invention is installed upstream of this steering wheel 14 in the inlet duct, in order to reduce reflection on the first moving wheel 13 of electromagnetic radiations that penetrated the inlet duct 9.

In this context, the masking wheel according to the invention comprises an outer casing located at the inlet of the turbojet and to which the vanes are connected through their tips Sm, and an inner shell 16 to which the vanes are connected through their roots Pd.

Figure 8:
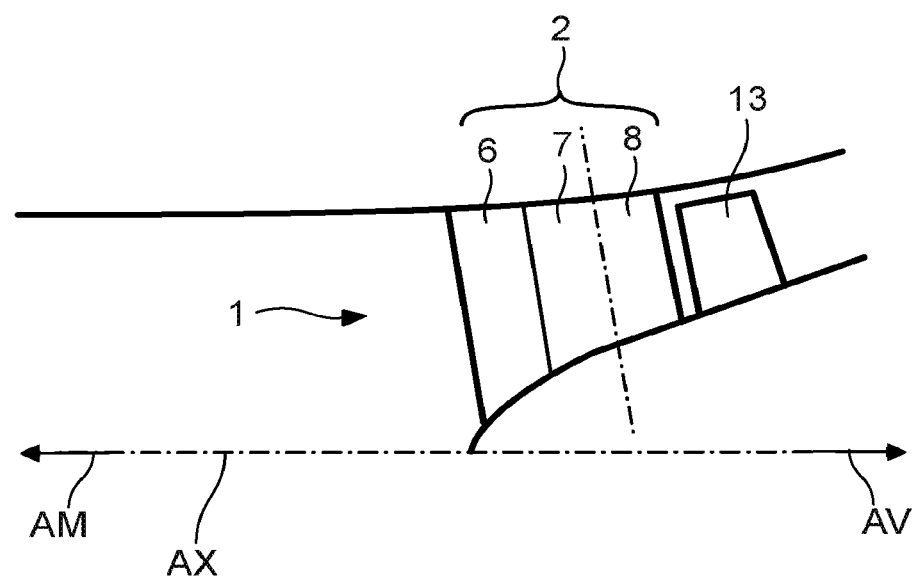
FIG. 8 is a schematic longitudinal cross-section view of an engine inlet portion equipped with a masking wheel according to the invention directly arranged upstream of the low pressure compressor.
Figure 9:
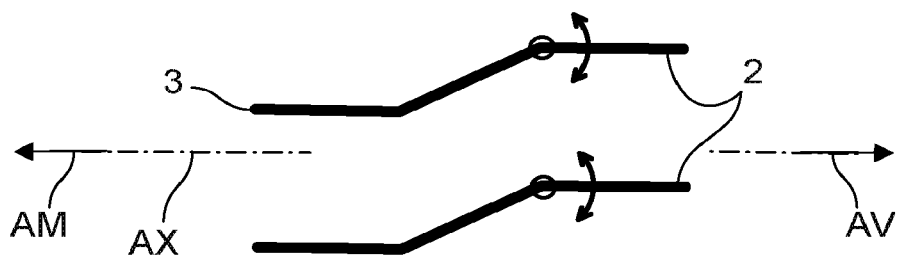
FIG. 9 is a schematic representation showing two consecutive masking vanes each having a downstream variable setting flap according to another alternative of the invention.

According to another arrangement represented in FIG. 8, the masking wheel according to the invention is located immediately upstream of the first moving wheel 13 of the compressor, so as to jointly perform functions of masking wheel and inlet steering wheel for the compressor.

With this other arrangement, the pressure losses introduced by the masking wheel are reduced by the fact that it replaces the existing steering wheel: the flow passing through the engine is entirely stabilised by the masking wheel before reaching the first moving wheel of the compressor: it is then the downstream axial portions 8 of the masking vanes that perform the function of the input steering wheel.

In this other arrangement, the vanes 2 are advantageously in two parts: a first, fixed part including the upstream portion 6 and the central portion 7, and a second part with variable setting including the downstream portion 8.

The second part thus constitutes a variable setting flap, capable of pivoting about its upstream edge which extends at the concave zone CCi of the lower surface wall Pi and the convex zone CVe of the upper surface wall Pe.

The setting angle of the flap is then controlled to be adjusted according to the engine operating conditions so as to best adjust the flow straightening before intake into the compressor.

Generally speaking, the vanes are dimensioned to optimise the masking coefficient in order to reduce the radar signature, while maintaining sufficient compressor performance. This dimensioning mainly consists in determining the tilt angle of the central oblique portion, and the chord length C of this oblique portion, that is the masking coefficient and the relative pitch. In practice, it appears that optimal operating trade-offs can be achieved for a tilt of the oblique portion significantly less than 30° and a relative pitch less than 0.6.

In order to increase stealth, the vanes 2 can advantageously be covered with a coating that partially absorbs incident electromagnetic radiations.

Furthermore, the invention has been described within the context of reducing the radar signature of a turbojet engine, but it is equally applicable to reducing the noise emissions of such a turbojet engine. In the latter case, the invention applies especially to an engine integrated into an aircraft tail unit, also called a buried engine.

The invention claimed is:

1. A bladed wheel for masking a moving wheel of a turbojet engine, comprising:
    vanes, each vane including a lower surface wall and an upper surface wall joined at a leading edge and at a trailing edge and extending along a span axis from a root to a tip, wherein:
    the lower surface wall includes an upstream axial portion extending from the leading edge to a convex zone of said lower surface wall, a central portion extending from the convex zone to a concave zone of said lower surface wall, and a downstream axial portion extending from the concave zone to the trailing edge, the upstream axial portion and the downstream axial portion extending along an extension direction, and the central portion being tilted relative to the extension direction and having an inversion of curvature;
    the upper surface wall includes an upstream axial portion extending from the leading edge to a concave zone of said upper surface wall, a central portion extending from the concave zone to a convex zone of said upper surface wall, and a downstream axial portion extending from the convex zone to the trailing edge, the upstream axial portion and the downstream axial portion extending along the extension direction, and the central portion being tilted relative to the extension direction and having an inversion of curvature;
    said concave zones and said convex zones each extend over most of the height of the vane along its span axis;
    the concave zone of the lower surface wall faces the convex zone of the upper surface wall, and the concave zone of the upper surface wall faces the convex zone of the lower surface wall;
    each vane is a variable setting vane mounted to pivot about a radial axis coinciding with its leading edge;
    in one position of the variable setting vane, the extension direction is parallel to a longitudinal axis of the turbojet engine;
    two consecutive vanes delimit therebetween an inter-vane fluid passage channel being a baffle between central portions of the two consecutive vanes tilted at a tilt angle with respect to the longitudinal axis of the turbojet engine, the inter-vane fluid passage channel presenting a pitch which is a distance separating the two consecutive vanes in a top view along a circumference of the bladed wheel; and
    a relative pitch of the inter-vane fluid passage channel corresponding to a ratio of the pitch to a chord length of the central portion of the vanes is less than 0.6, and the tilt angle is less than 30°.

2. The bladed wheel according to claim 1, wherein each vane comprises a downstream portion extending from the trailing edge to the convex and concave zones of its upper surface wall and lower surface wall respectively, and wherein each downstream portion is a variable setting flap pivotably mounted between the convex and concave zones of its upper surface wall and lower surface wall respectively.

3. The bladed wheel according to claim 1, wherein the vanes are covered with a coating absorbing electromagnetic radiations.

4. A turbojet engine comprising a low pressure compressor including a moving wheel upstream of which an inlet steering wheel is arranged, upstream of which a masking bladed wheel according to claim 1 is mounted.

5. A turbojet engine comprising a low pressure compressor including a moving wheel upstream of which a masking bladed wheel according to claim 1 is arranged.

6. The turbojet engine according to claim 4, further comprising a bent inlet duct connected to the turbojet engine and supplying the turbojet engine with air.

7. The turbojet engine according to claim 5, further comprising a bent inlet duct connected to the turbojet engine and supplying the turbojet engine with air.

8. A bladed wheel for masking a moving wheel of a turbojet engine, comprising:

vanes, each vane including a lower surface wall and an upper surface wall joined at a leading edge and at a trailing edge and extending along a span axis from a root to a tip, wherein:

the lower surface wall includes an upstream axial portion extending from the leading edge to a convex zone of said lower surface wall, a central portion extending from the convex zone to a concave zone of said lower surface wall, and a downstream axial portion extending from the concave zone to the trailing edge, the upstream axial portion and the downstream axial portion extending along an extension direction, and the central portion being tilted relative to the extension direction and having an inversion of curvature;

the upper surface wall includes an upstream axial portion extending from the leading edge to a concave zone of said upper surface wall, a central portion extending from the concave zone to a convex zone of said upper surface wall, and a downstream axial portion extending from the convex zone to the trailing edge, the upstream axial portion and the downstream axial portion extending along the extension direction, and the central portion being tilted relative to the extension direction and having an inversion of curvature;

said concave zones and said convex zones each extend over most of the height of the vane along its span axis;

the concave zone of the lower surface wall faces the convex zone of the upper surface wall, and the concave zone of the upper surface wall faces the convex zone of the lower surface wall;

each vane is a variable setting vane mounted to pivot about a radial axis coinciding with its leading edge;

the upstream axial portion and the downstream axial portion of the lower surface wall extend constantly parallel to each other, and the upstream axial portion and the downstream axial portion of the upper surface wall extend constantly parallel to each other;

two consecutive vanes delimit therebetween an inter-vane fluid passage channel being a baffle between central portions of the two consecutive vanes tilted at a tilt angle with respect to a longitudinal axis of the turbojet engine, the inter-vane fluid passage channel presenting a pitch which is a distance separating the two consecutive vanes in a top view along a circumference of the bladed wheel; and a relative pitch of the inter-vane fluid passage channel corresponding to a ratio of the pitch to a chord length of the central portion of the vanes is less than 0.6, and the tilt angle is less than 30°.

* * * * *